Aug. 11, 1931.      T. J. SCOFIELD ET AL      1,818,817
PROJECTOR FOR SIGNALING DEVICES
Filed Aug. 3, 1928      2 Sheets-Sheet 1
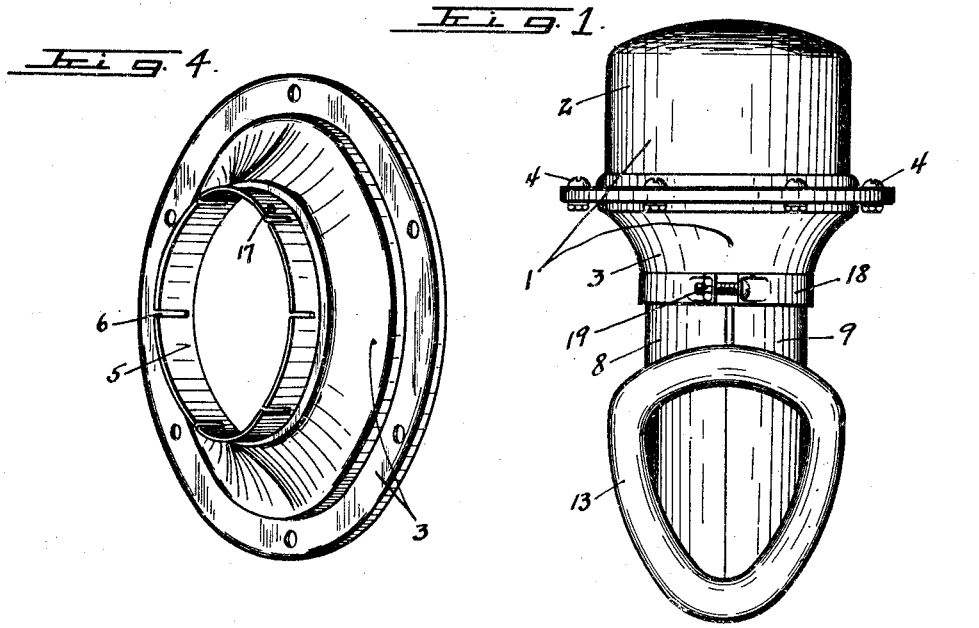
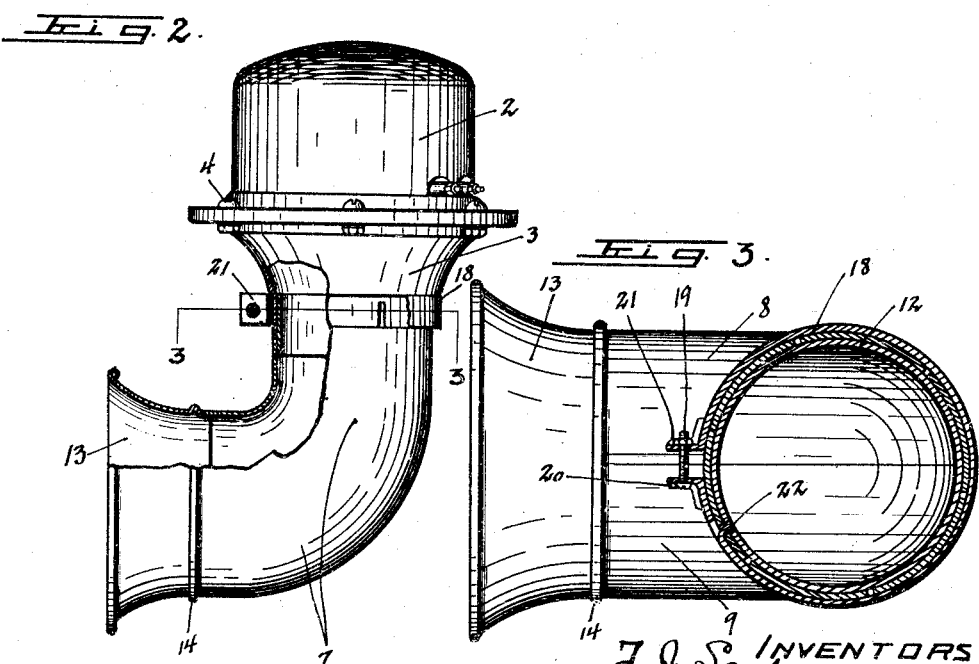

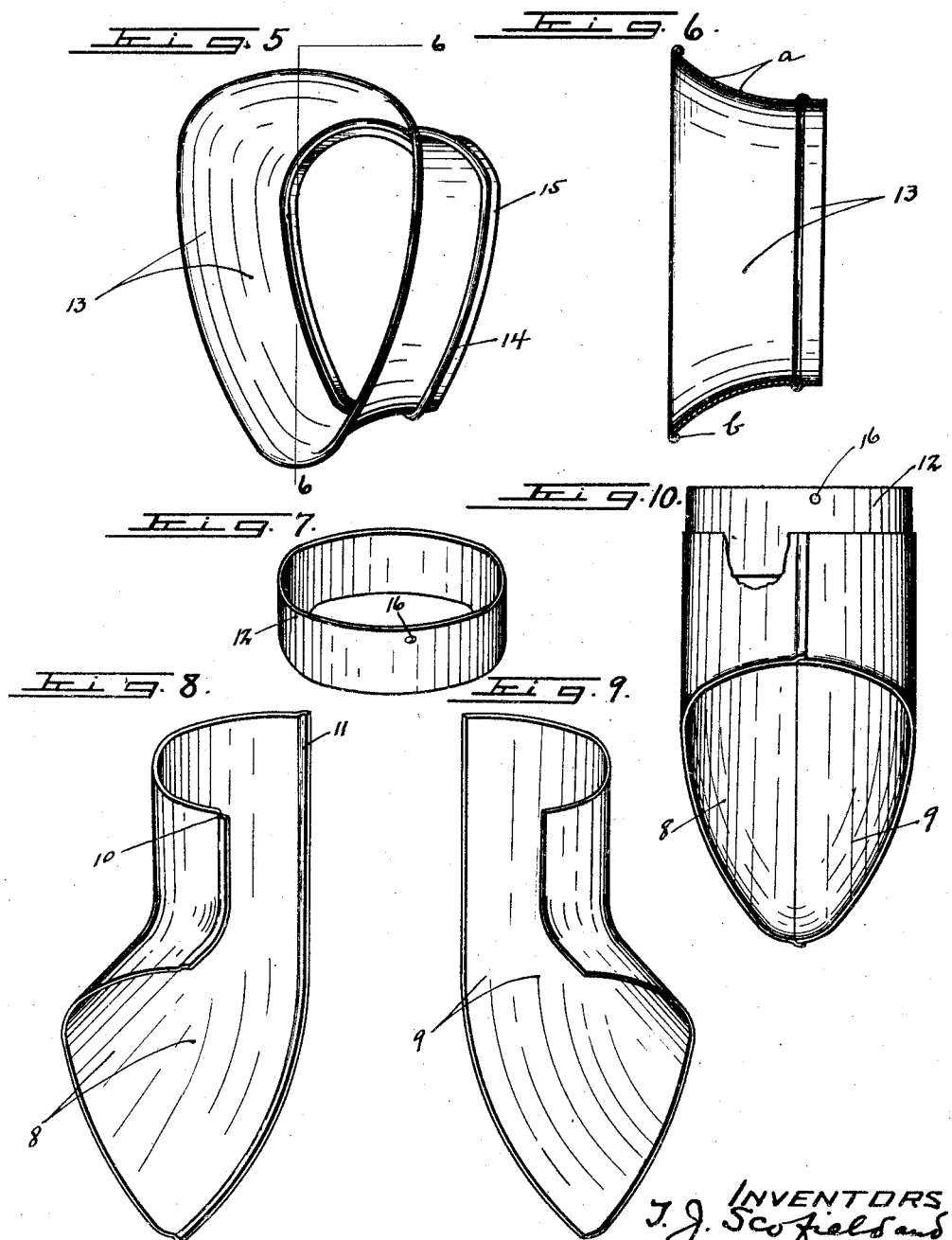

Patented Aug. 11, 1931

1,818,817

UNITED STATES PATENT OFFICE

THEODORE J. SCOFIELD AND GEORGE A. WHITE, OF JACKSON, MICHIGAN, ASSIGNORS TO THE SPARKS-WITHINGTON COMPANY, OF JACKSON, MICHIGAN, A CORPORATION OF OHIO

PROJECTOR FOR SIGNALING DEVICES

Application filed August 3, 1928. Serial No. 297,212.

This invention relates to a new and improved projector for signaling devices and the method of manufacturing the same.

In signaling devices particularly those used on automobiles and the like it is usual to have a projector attached to the signaling device for the purpose of amplifying and directing the sound produced by the signaling device.

These projectors have usually been approximately straight in form and inasmuch as the projectors in order to be efficient must be of considerable length a straight projector combined with a signaling device takes up considerable room and in consequence the places on the automobile where it can be affixed are to some extent limited.

We have discovered that a projector for a signaling device may be made in a curved shape and if desired this curve may be abrupt so that the sound will issue on a line in a direction at approximately right angles to the direction from which it issued from the signaling device. A projector of this form has the advantage that the complete signaling device will occupy less linear space which permits it to be installed on parts of the automobile on which a straight projector signaling device can not be installed.

Furthermore a signaling device with a curved projector has a greater esthetic appeal to a great many people than has a signaling device with a straight projector.

The main object of our invention is to produce a signaling device in which the projector is curved so that the sound will leave the projector in an angular direction to the direction from which the sound issued from the signaling device itself.

Another object is to produce a signaling device with a curved projector which will be pleasing in appearance and with a greater esthetic appeal than the ordinary signaling device with a straight projector.

Another object is to devise a method by which a projector of this character may be manufactured from sheet metal rather than from cast metal in order that the finished article may be comparatively light in weight.

Other objects and advantages relate to the size, shape, arrangement of parts and the method by which they are assembled together all as will more fully appear from the following description taken in connection with the accompanying drawings, in which:

Figure 1 is a front elevation of our complete signaling device.

Figure 2 is a side elevation partially broken away and partially in section of the same.

Figure 3 is a section on line 3—3 of Figure 2.

Figure 4 is a perspective view of the lower portion of the signaling device casing.

Figure 5 is a perspective view of the mouth portion of our projector.

Figure 6 is a section on line 6—6 of Figure 5.

Figure 7 is a perspective view of the collar used in assembling the device.

Figure 8 is a perspective view of one-half of the conduit of our projector.

Figure 9 is a perspective view of the other half of the conduit of our projector.

Figure 10 is a perspective view of the parts shown in Figures 7, 8 and 9 after they have been assembled.

Inasmuch as our invention is directed to a projector for signaling devices and inasmuch as it may be used with any type of signaling device we have here shown only the outside casing —1— of a well-known type of motor driven signaling device. The casing —1— has a top portion —2— and a bottom portion —3— bolted together as by bolts —4—. The bottom portion —3—, as may best be seen from Figure 4, has a depending flange —5— having a series of spaced vertical slots —6— for a purpose hereinafter to be described.

In forming our projector —7— we first form from sheet metal or other appropriate material a pair of opposed halves —8— and —9— of an elbow pipe section. The member —8— is provided on its opposite longitudinal edges with grooves —10— and —11— into which the longitudinal edges of the member —9— are received when they are assembled together to make an elbow pipe section, as may best be seen from Figure 10. When members —8— and —9— have been assembled together they are secured together by spot-welding or other convenient means.

We then form a circular collar —12— having an outside diameter corresponding to the inside diameter of the upper part of the elbow pipe sections formed by the assembly of members —8— and —9—. Collar —12— is positioned in the upper portion of the elbow pipe sections formed by the assembly of members —8— and —9— with a portion thereof extending above the upper edge of such elbow pipe section as perhaps may best be seen from Figure 10 and is then secured in position by spot-welding or other convenient means.

We preferably form the lower end of members —8— and —9— so that when they are assembled as shown in Figure 10 the opening formed by the lower ends of members —8— and —9— will be ovoid in shape altho it will be understood that such opening may be circular or of any other shape desired.

As perhaps may best be seen from Figures 5 and 6 the bell portion —13— of our device is formed preferably from a sheet metal tube having its outer end flared outwardly as shown at —a— in Figure 6 and is provided with a circumferential bead —14— in spaced relation to its inner end. The shape of the bell member —13— conforms to the shape of the opening at the lower end of the conduit formed by the assembly of members —8— and —9— and the size of the inner edge —15— of the member —13— is such that it fits inside the conduit formed by the assembly of members —8— and —9— with the bead —14— abutting against such conduit as perhaps may best be seen from Figure 2. When the parts are thus assembled they are secured together by spot-welding or other convenient means. For the purpose of appearance we prefer to form a bead around the outer edge of member —13— as shown at —b— on Figure 6.

When the parts have been assembled as above described member —3— is assembled therewith by inserting collar —12— into flange —5— of Figure 4, the slots —6— permitting the parts of flange —5— therebetween to spring slightly outwardly as collar —12— is inserted in flange —5—. Collar —12— is provided with an aperture —16— which is placed in registration with aperture —17— in flange —5— when the parts are assembled together.

As perhaps may best be seen from Figures 1 and 3 a strap —18— is positioned around flange —5— and when thus positioned is placed under tension by means of a bolt —19— which extends through the opposite outwardly bent ends —20— and —21— of strap —18—. Strap —18— is provided with an inwardly bent prong —22— which extends inwardly through apertures —16— and —17— to prevent relative movement of members —3— and —12—.

When the parts are thus assembled the upper portion of the signaling device —1— is placed in position on member —3— and is secured thereto by bolts —4—.

It will be understood that the exact shape of our projector —7— both as to the curvature of the main body thereof and the shape of the opening therein may be varied to a considerable degree without departing from the spirit of our invention. It will also be understood that the materials of which the different parts of our device are constructed may also be varied as desired, and it will also be understood that the particular type of signaling device with which our projector is used is immaterial provided only that it is the type of signaling device with which a projector may be used, for altho we have shown and described a specific structure and form of part and method of assembling the different parts thereof we do not desire to restrict ourselves to the exact size, shape or relation of parts as various changes may be made within the scope of the appended claims.

We claim:

1. A projector for a signaling device comprising a throat piece consisting of opposed halves of an elbow pipe section joined at their edges, a collar secured in the upper end of the throat piece and having a portion extending outwardly therefrom, and a bell portion secured to the other end of the throat piece.

2. In combination with a signaling device a projector comprising a throat piece consisting of opposed halves of an elbow pipe section joined together at their edges, the opening at one end of the throat piece being approximately ovoid in shape, a collar having one end secured in the opposite end of the throat piece and having a portion extending outwardly therefrom adapted to be secured in the outlet end of a signaling device, and a bell portion secured to the ovoid shaped end of the throat piece.

In witness whereof we have hereunto set our hands this 24th day of July 1928.

THEODORE J. SCOFIELD.
GEORGE A. WHITE.